2,894,980
PREPARATION OF ALKOXYSUCCINIC ACID ESTERS

Hyman R. Lubowitz and Harry Greenberg, Cincinnati, Ohio, assignors to National Distillers and Chemical Corporation, New York, N.Y., a corporation of Virginia No Drawing. Application April 16, 1956
Serial No. 578,181

6 Claims. (Cl. 260—484)

The present invention relates to a novel process for preparation of alkoxy succinic esters and, more particularly, to a process for preparation of alkoxy succinic esters from fumaric acid or esters of fumaric acid.

Broadly speaking, the process of this invention comprises subjecting a fumaric acid-containing material to reaction in the presence of an alcohol and a relatively large amount of a suitable acid defined more fully hereinafter, the reaction being carried out by heating a reaction mixture containing the fumaric acid-containing material, alcohol and acid to an elevated temperature, such as by maintaining the reaction mixture under reflux conditions, until relatively high yields of the alkoxy succinic acid ester is obtained. For use as the acid in the reaction mixture, suitable materials include inorganic and organic acids that are known to be esterification catalysts and which, for purposes of illustration, include inorganic acids such as sulfuric acid, phosphoric acid, and the like, and organic acids such as p-toluene sulfonic acid. For practice of the invention embodied herein, suitable fumaric acid-containing materials include fumaric acid per se, diesters of fumaric acid, monoesters of fumaric acid, and mixtures of fumaric acid and its esters.

In the use of fumaric acid per se as the starting material, the reaction for production of relatively high yields of the alkoxy succinate is carried out with use of an alcohol in substantial excess over the amount theoretically required to form the diester of the fumaric acid and, preferably, in an amount greater than three moles of the alcohol to one mole of fumaric acid. For preparation of alkoxy succinates directly from fumaric acid, the reaction thereof in the presence of the alcohol is carried out in the presence of a relatively large amount of a suitable acid, i.e., an amount larger than is normally required or conventionally used for esterification of fumaric acid to its corresponding diesters. Thus, and although the amount of a suitable acid, such as sulfuric acid, that may be employed in practice of this invention with use of fumaric acid as the starting material may be varied depending upon certain factors such as the particular alcohol employed, the suitable acid is generally employed in an amount of from about 5 to about 50% by weight based on the amount of fumaric acid subjected to the reaction. More specifically, the described reaction for preparation of relatively high yields of alkoxy succinates from fumaric acid is carried out in the presence of an acid such as sulfuric acid in an amount of from about 10 to 20% by weight of the fumaric acid reactant.

In the use of a dialkyl ester of fumaric acid as the starting material, such as the diester of fumaric acid resulting from esterification of fumaric acid with an aliphatic monohydric alcohol, the fumaric acid ester is reacted with an alcohol in the presence of an acid as aforedefined. The reaction is carried out by heating the reaction mixture to an elevated temperature which is determined by the boiling point of the mixture (e.g., 100 to 125° C.). For such a reaction, the amount of alcohol employed may be varied but, in suitable embodiments, the alcohol is used in a range of from about 1.5 to about 4.5 moles of alcohol to one mole of the diester of fumaric acid and in the presence of an acid such as sulfuric acid in an amount of from about 10 to about 20% based on the weight of the fumarate reactant.

For the reaction carried out with fumaric acid as the starting material, the alcohol utilized for conversion thereof to alkoxy succinates may be any suitable monohydric alcohol and, particularly, the alcohols in the series starting with methanol and including ethanol, butanol, octanol, 2-ethyl hexanol, and the like. Thus, by use of particular alcohols from such a series, the fumaric acid subjected to reaction as embodied herein can be converted to substances such as diethyl ethoxy succinate, di-n-butyl n-butoxy succinate, and other succinates corresponding to the particular alcohol employed. Preferred, however, is the use of saturated aliphatic monohydric alcohols, straight chain or branch chain, containing from about 2 to about 14 carbon atoms per molecule. Moreover, the reaction may be carried out with use of a mixture of such alcohols for production of mixed alkoxy succinates in which case the ester groups and/or the alkoxy group in the resulting alkoxy succinate are derived from different alcohols.

Similarly, in the preparation of alkoxy succinates from diesters of fumaric acid, the alcohol utilized for the reaction may be the same as that from which the diester was prepared, or it may be a different alcohol. For example, in the use of dibutyl fumarate as the starting material, it may be reacted with butanol to form the dibutyl butoxy succinate or it may be reacted with an alcohol such as propanol to form some dibutyl propoxy succinate.

Thus, in accordance with this invention, a fumaric acid-containing substance such as fumaric acid per se or an alkyl ester of fumaric acid is subjected to reaction with an amount of a suitable alcohol in excess of that theoretically required to convert the fumaric acid substance to the corresponding alkoxy succinate in the presence of an acid as aforedefined in an amount of from about 5 to about 50%, based on the weight of the corresponding alkyl succinate, the reaction being carried out at temperatures determined by the boiling point of the mixture (e.g., 100–125° C.) for a period of time sufficient to provide the dialkyl alkoxy succinate in substantially high yields.

In order to further describe the invention, the following embodiments are set forth for purposes of illustration and not limitation.

Example 1

Two hundred and fifty-one grams of di-n-butyl fumarate (1.1 moles) were mixed with 300 grams of butanol (4.05 moles) and 25 cc. of concentrated sulfuric acid (18.5% by weight of dibutyl fumarate) in a one liter flask, the sulfuric acid being added slowly to the fumarate-butanol solution with rapid stirring. The resulting solution was maintained under reflux for 24 hours (during which the reaction temperature adjusted itself to about 120° C.) with removal of water formed during the reaction as an azeotrope with butanol (B.P. 92.4° C.), stratification of the azeotrope, and return of the alcohol to the reaction flask.

Seventy-seven grams of $NaHCO_3$ were added with stirring to the reaction vessel following the 24 hour reaction period and the reaction mixture was cooled to room temperature and filtered. The filtrate was then subjected to fractional distillation at reduced pressure (10 mm.) with recovery of di-n-butylbutoxy succinate in a 30% yield.

The product was identified as di-n-butylbutoxy succinate (iodine no.=0) by extended saponification thereof with strong potassium hydroxide which yielded three molecules of butanol per molecule of dibutyl butoxy succinate and fumaric acid as products; and by a carbon and hydrogen analysis as set forth herein below in comparison with the corresponding theoretical values for di-n-butyl butoxy succinate.

| Found | | Theory | |
|---|---|---|---|
| Percent C | Percent H | Percent C | Percent H |
| 64.45 | 10.29 | 63.58 | 10.00 |

The di-n-butyl butoxy succinate boiled at 175° C. (10 mm.) and had an index of refraction of 1.4315 at 25° C. Corresponding properties for di-n-butyl fumarate are 145° C. (10 mm.) and 1.4445. The di-n-butyl butoxy succinate was further identified by infrared which showed the absence of free carboxyl groups or unsaturation in the molecule.

*Example 2*

One hundred and eighty-six grams of fumaric acid (1.6 moles) were mixed with 600 ml. of butanol (6.47 moles) and 30 cc. of 33% sulfuric acid. The solution was refluxed for 24 hours in the manner described in Example 1. The thus treated solution was allowed to cool to 55° C. and neutralized by addition, with stirring, of 32 grams of NaHCO$_3$. The neutralized mixture was then cooled to room temperature and filtered. The filtrate was subjected to fractional distillation with obtainment of a 23% yield of di-n-butyl butoxy succinate boiling at 175° C. at 10 mm. pressure. The index of refraction of the thus obtained butoxy succinate was 1.4317 at 25° C. and 1.4324 at 22° C.

While there are above disclosed but a limited number of embodiments of process of the invention herein presented, it is possible to produce still other embodiments without departing from the inventive concept herein disclosed, and it is desired therefore that only such limitations be imposed on the appended claims as are stated therein.

What is claimed is:

1. A process for preparation of alkoxy succinic esters which comprises subjecting to reflux temperature a reaction mixture comprising a fumaric acid-containing material from the group consisting of fumaric acid, lower molecular weight dialkyl esters of fumaric acid, and mixtures thereof, a lower molecular weight alkanol in an amount in excess of that theoretically required to convert the fumaric acid-containing material to an alkoxy succinate, and an acidic esterification catalyst in an amount of at least about 5% by weight, based on the fumaric acid content of said fumaric acid-containing material, for a period of time sufficient to convert a substantial amount of said fumaric acid-containing material to a dialkyl ester of an alkoxysuccinic acid.

2. A process, as defined in claim 1, wherein the catalyst is sulfuric acid.

3. A process, as defined in claim 1, wherein the alkanol contains up to eight carbon atoms.

4. A process, as defined in claim 1, wherein the catalyst is sulfuric acid in an amount of from about 5 to about 50% by weight based on the amount of the fumaric acid content of said fumaric acid-containing material.

5. A process, as defined in claim 4, wherein the alkanol contains from two to eight carbon atoms.

6. A process for preparing alkoxy succinic esters which comprises subjecting to reflux temperatures a reaction mixture comprising fumaric acid, a saturated aliphatic monohydric alcohol having from about two to eight carbon atoms, in an amount in excess of that theoretically required to convert the fumaric acid to an alkoxy succinate, and an acidic esterification catalyst in an amount from about 5 to 50% by weight, based on the fumaric acid, for a time period sufficient to convert a substantial amount of said fumaric acid to a dialkyl ester of an alkoxysuccinic acid.

References Cited in the file of this patent

UNITED STATES PATENTS

| 2,120,688 | Towne | June 14, 1938 |
| 2,220,855 | Slagh | Nov. 5, 1940 |
| 2,281,394 | Sorenson | Apr. 28, 1942 |